(12) United States Patent
Suzuki et al.

(10) Patent No.: US 8,121,301 B2
(45) Date of Patent: Feb. 21, 2012

(54) EARPIECE, ELECTRONIC DEVICE AND COMMUNICATION DEVICE

(75) Inventors: Shinya Suzuki, Shizuoka (JP); Emi Takahashi, Kanagawa (JP); Yukinari Inoue, Shizuoka (JP)

(73) Assignee: Panasonic Corporation, Osaka (JP)

( * ) Notice: Subject to any disclaimer, the term of this patent is extended or adjusted under 35 U.S.C. 154(b) by 1177 days.

(21) Appl. No.: 11/910,099

(22) PCT Filed: Mar. 31, 2006

(86) PCT No.: PCT/JP2006/306919
§ 371 (c)(1),
(2), (4) Date: Sep. 28, 2007

(87) PCT Pub. No.: WO2006/106955
PCT Pub. Date: Oct. 12, 2006

(65) Prior Publication Data
US 2008/0279411 A1    Nov. 13, 2008

(30) Foreign Application Priority Data
Apr. 1, 2005    (JP) .................................. 2005-106329

(51) Int. Cl.
*H04R 29/00* (2006.01)
(52) U.S. Cl. .............................. 381/58; 381/59; 381/111
(58) Field of Classification Search .................... 381/58, 381/59, 111
See application file for complete search history.

(56) References Cited

U.S. PATENT DOCUMENTS

| | | | |
|---|---|---|---|
| 6,473,625 B1 * | 10/2002 | Williams et al. | 455/569.1 |
| 6,621,910 B1 * | 9/2003 | Weckstrom et al. | 381/351 |
| 6,758,303 B2 * | 7/2004 | Zurek et al. | 181/155 |
| 6,785,395 B1 * | 8/2004 | Arneson et al. | 381/334 |
| 6,788,798 B1 * | 9/2004 | Backman | 381/372 |
| 7,068,979 B2 * | 6/2006 | Pedersen et al. | 455/90.3 |
| 7,346,175 B2 * | 3/2008 | Hui et al. | 381/74 |
| 7,461,718 B2 * | 12/2008 | Dedieu et al. | 181/148 |

(Continued)

FOREIGN PATENT DOCUMENTS

JP          62-42397          3/1987

(Continued)

OTHER PUBLICATIONS

Oguri, S. et al., Office Action mailed Nov. 8, 2010, for Japanese Patent Application No. 2007-511192, 6 pages.

(Continued)

*Primary Examiner* — David S. Warren
(74) *Attorney, Agent, or Firm* — Seed IP Law Group PLLC

(57) ABSTRACT

An earpiece, an electronic device, and a communication device, capable of reducing the influence of leakage of sounds from a clearance between the earpiece and an ear not to need an addition of parts are provided. An earpiece (100) includes an electromechanical acoustic transducer (10) having a diaphragm and for generating a sound by vibrating the diaphragm in response to an electric signal, a case (11) on which a sound hole (12) is provided and in which the electromechanical acoustic transducer (10) is housed, and a holding member (13) for holding the electromechanical acoustic transducer (10) in the case (11). The electromechanical acoustic transducer (10) has a sound pressure-frequency characteristic that is compensated in advance such that the sound pressure-frequency characteristic is planarized in a condition that the generated sound is leaked from a user's ear (14) being covered with the case (11).

7 Claims, 5 Drawing Sheets

U.S. PATENT DOCUMENTS

| | | | |
|---|---|---|---|
| 7,801,571 B2* | 9/2010 | Friedman et al. | 455/569.1 |
| 2001/0014161 A1* | 8/2001 | Baiker et al. | 381/59 |
| 2003/0003945 A1 | 1/2003 | Saiki et al. | |
| 2003/0035549 A1* | 2/2003 | Bizjak et al. | 381/56 |
| 2003/0108209 A1 | 6/2003 | McIntosh | |
| 2004/0084244 A1* | 5/2004 | Zurek et al. | 181/156 |
| 2004/0143433 A1* | 7/2004 | Marumoto et al. | 704/225 |
| 2004/0184623 A1* | 9/2004 | Johannsen et al. | 381/117 |

FOREIGN PATENT DOCUMENTS

| | | |
|---|---|---|
| JP | 08-033078 | 2/1996 |
| JP | 08-102991 | 4/1996 |
| JP | 10-304036 | 11/1998 |
| JP | 2000-152379 A | 5/2000 |
| JP | 2000-232505 | 8/2000 |
| JP | 2002-027589 A | 1/2002 |
| JP | 2002-501683 | 1/2002 |
| JP | 2003-023482 | 1/2003 |
| JP | 2003-111194 A | 4/2003 |
| JP | 2005-073129 | 3/2005 |
| WO | 9824214 | 6/1998 |
| WO | 03/050942 A1 | 6/2003 |
| WO | 2004/080116 A2 | 9/2004 |

OTHER PUBLICATIONS

Panasonic Corporation, Supplementary European Search Report, mailed Mar. 2, 2011, for European Patent Application No. EP 06 73 0867, 8 pages.

International Search Report dated Jul. 18, 2006.

* cited by examiner

EARPIECE, ELECTRONIC DEVICE AND COMMUNICATION DEVICE

TECHNICAL FIELD

The present invention relates to an earpiece, an electronic device, and a communication device.

BACKGROUND ART

Both a sound volume and a sound quality are deteriorated in an earpiece of the mobile terminal device, or the like since leakage of sounds generated due to a clearance between the user's ear and the earpiece gives rise to a decrease in a sound pressure in a low-frequency band of the sound pressure-frequency characteristic.

In particular, the earpiece of the stationary terminal device has a relatively large shape and it is easy to cover the user's ear fully with this earpiece, but the earpiece of the mobile terminal device has a plane shape because such earpiece is formed integrally with other parts such as the display portion, and the like. Therefore, it is difficult to cover the user's ear fully with the earpiece and the leakage of sounds takes place more conspicuously, and thus a sound volume and a sound quality are deteriorated considerably.

As the reform measures for this, the measure for reducing the leakage by fitting a ring gasket to a contact portion between the earpiece and the user's ear to improve a sealing performance of the user's ear with the earpiece (see Patent Literature 1, for example), the measure for controlling a frequency characteristic by a signal processing means by fitting a pressure sensor near the earpiece to sense a contact state between the earpiece and the user's ear (see Patent Literature 2, for example), and the like have been proposed.
Patent Literature 1: JP-T-2002-501683
Patent Literature 2: JP-A-8-102991

DISCLOSURE OF THE INVENTION

Problems that the Invention is to Solve

However, in the earpiece in the prior art, there existed the circumstances that, since the parts must be added to compensate for the sound pressure characteristic due to the leakage of sounds caused by the clearance between the earpiece and the user's ear, an increase in cost and restrictions on design and shape arise.

The present invention has been made in view of the above circumstances, and it is an object of the present invention to provide an earpiece, an electronic device, and a communication device capable of reducing the influence of leakage of sounds from a clearance between the earpiece and an ear not to need an addition of parts.

Means for Solving the Problems

An earpiece of the present invention includes an electromechanical acoustic transducer having a diaphragm, for generating a sound by vibrating the diaphragm in response to an electric signal; a case on which a sound hole is provided and in which the electromechanical acoustic transducer is housed; and a holding member for holding the electromechanical acoustic transducer in the case; wherein the electromechanical acoustic transducer has a sound pressure-frequency characteristic that is compensated in advance such that the sound pressure-frequency characteristic is planarized in a condition that the generated sound is leaked from an ear being covered with the case.

According to this configuration, the sound pressure-frequency characteristic of the electromechanical acoustic transducer is compensated in advance such that the sound pressure-frequency characteristic is planarized under the condition that the sounds are leaked from the clearance between the case and the user's ear. Therefore, the influence of the leakage can be reduced without any addition of parts.

Also, in the earpiece of the present invention, the sound pressure-frequency characteristic is given as a characteristic that is compensated based on a difference between the sound pressure-frequency characteristic derived when a leakage is caused and the sound pressure-frequency characteristic derived when no leakage is caused.

According to this configuration, the sound pressure-frequency characteristic is compensated based on the difference between the sound pressure-frequency characteristics derived when the leakage of sounds from the clearance between the case and the user's ear is caused and when no leakage is caused. Therefore, a good characteristic of the electromechanical acoustic transducer can be set.

Also, in the earpiece of the present invention, the sound pressure-frequency characteristic is compensated such that a lowest resonance frequency is lowered.

According to this configuration, a reduction in sound pressure in the low-frequency band due to the leakage of the sounds from the clearance between the case and the user's ear can be prevented.

An electronic device of the present invention includes the above earpiece. According to this configuration, the sound pressure-frequency characteristic of the electromechanical acoustic transducer is compensated in advance such that the sound pressure-frequency characteristic is planarized under the condition that the sounds are leaked from the clearance between the case and the user's ear. Therefore, the influence of the leakage can be reduced without any addition of parts.

A communication device of the present invention includes an antenna for receiving a radio signal; a signal outputting portion for outputting an electric signal in response to the received radio signal; an electromechanical acoustic transducer having a diaphragm, for generating a sound by vibrating the diaphragm in response to the electric signal being output from the signal outputting portion; a case on which a sound hole is provided and in which the electromechanical acoustic transducer is housed; a holding member for holding the electromechanical acoustic transducer in the case; wherein the electromechanical acoustic transducer has a sound pressure-frequency characteristic that is compensated in advance such that the sound pressure-frequency characteristic is planarized in a condition that the generated sound is leaked from an ear being covered with the case.

According to this configuration, the sound pressure-frequency characteristic of the electromechanical acoustic transducer is compensated in advance such that the sound pressure-frequency characteristic is planarized under the condition that the sounds are leaked from the clearance between the case and the user's ear. Therefore, the influence of the leakage can be reduced without any addition of parts.

Advantages of the Invention

According to the present invention, the earpiece, the electronic device, and the communication device, capable of reducing the influence of leakage of sounds from a clearance between the earpiece and an ear not to need an addition of parts can be provided.

Figure 1:
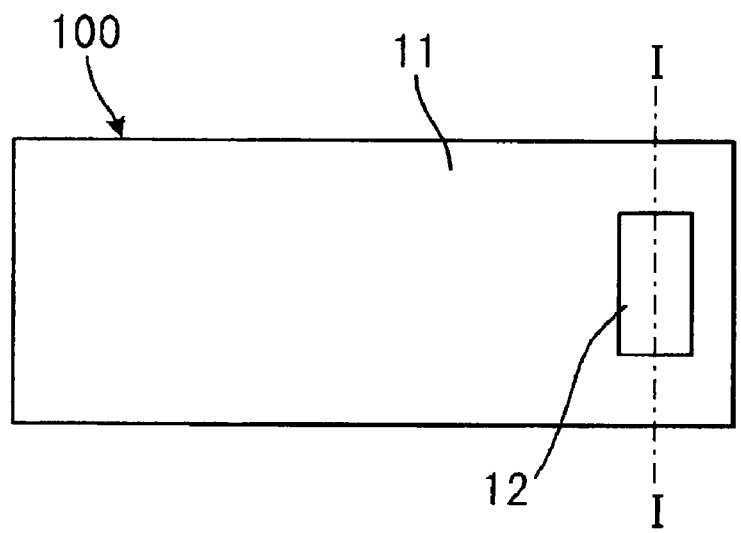
FIG. 1 A view showing an earpiece according to a first embodiment of the present invention.
Figure 1:
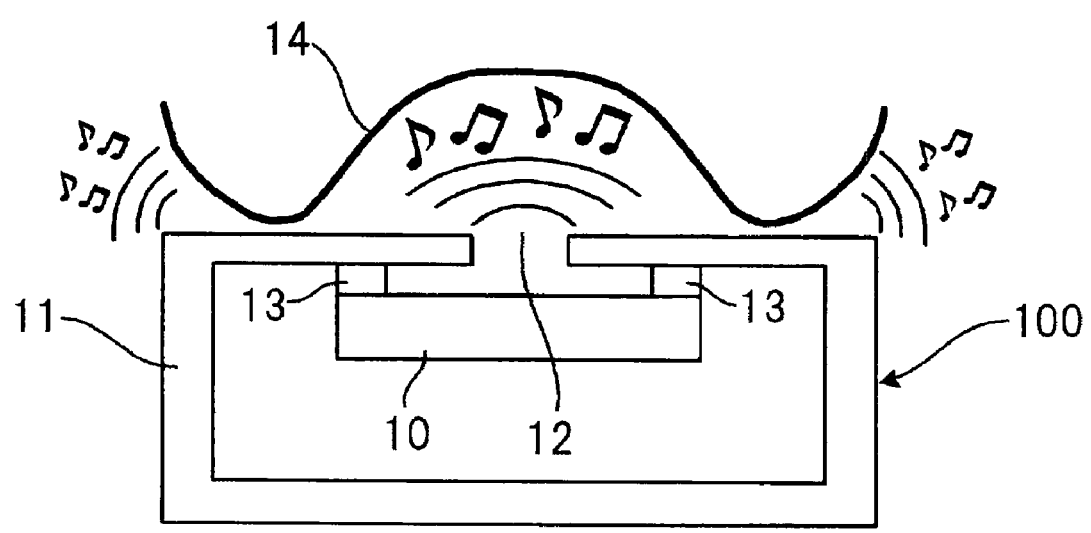

DESCRIPTION OF REFERENCE NUMERALS 10 electromechanical acoustic transducer
11 case
12 sound hole
13 holding member
14 user's ear
20, 30 first case
21, 31 second case
22 antenna
23, 32 hinge
24, 34 display portion
25 operation portion
26 receiver circuit
27 signal outputting portion
33 controlling portion
35 signal outputting portion
100 earpiece
101 yoke
102 magnet
103 plate
104 voice coil
105 diaphragm
106 frame
200 communication device
300 electronic device

BEST MODE FOR CARRYING OUT THE INVENTION

First Embodiment

FIG. 1 is a view showing an earpiece according to a first embodiment of the present invention, wherein FIG. 1(a) is a plan view of the earpiece and FIG. 1(b) is a sectional view of the earpiece taken along a dot-dash line I-I in FIG. 1(a).

As shown in FIG. 1, an earpiece 100 of the first embodiment includes an electromechanical acoustic transducer 10 for outputting sounds in response to an electric signal, a case 11 on which a sound hole 12 is provided and in which the electromechanical acoustic transducer 10 is housed, and a holding member 13 for holding the electromechanical acoustic transducer 10 in the case 11.

Figure 2:
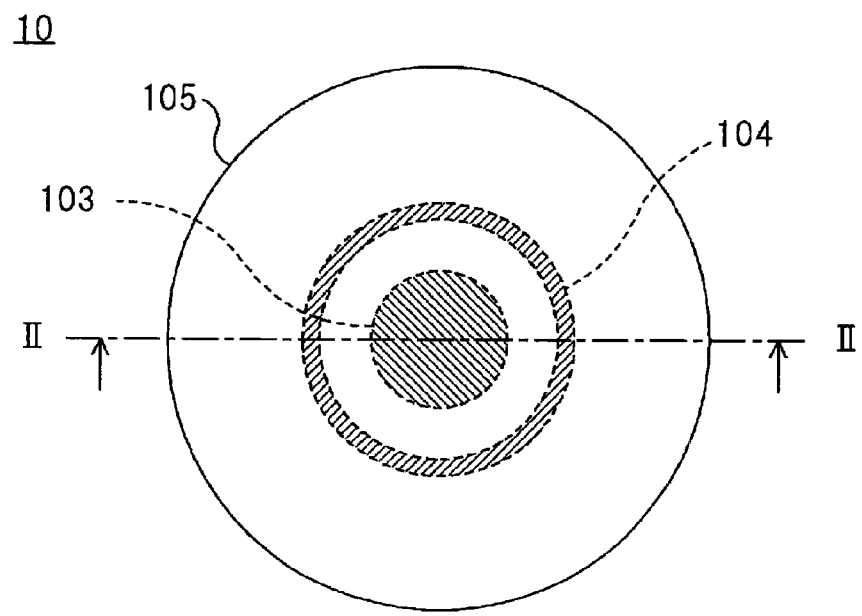
FIG. 2 A view showing an electromechanical acoustic transducer of the earpiece according to the first embodiment of the present invention.
Figure 2:
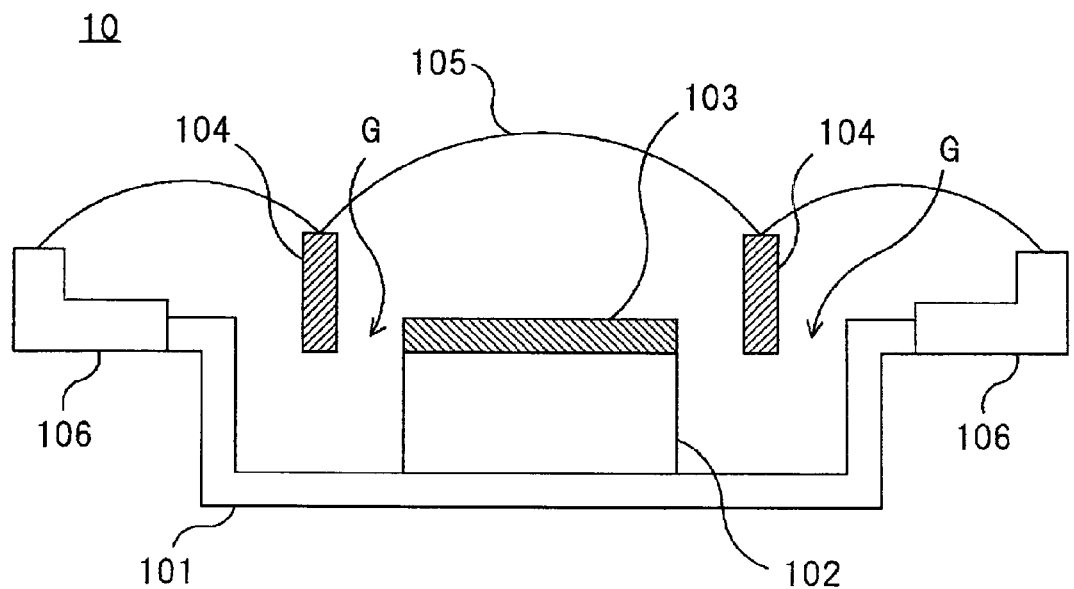

The electromechanical acoustic transducer 10 has a diaphragm and generates the sounds by vibrating the diaphragm in response to the electric signal. FIG. 2 is a view showing an electromechanical acoustic transducer of the earpiece according to the first embodiment of the present invention, wherein FIG. 2(a) is a top view of the electromechanical acoustic transducer and FIG. 2(b) is a sectional view of the electromechanical acoustic transducer taken along a dot-dash line II-II in FIG. 2(a).

As shown in FIG. 2, the electromechanical acoustic transducer 10 has a yoke 101, a magnet 102 provided on the yoke 101, a plate 103 provided on the magnet 102, a voice coil 104, a diaphragm 105, and a frame 106.

The yoke 101, the magnet 102, and the plate 103 constitute a magnetic circuit having an air gap G. The voice coil 104 is constructed by winding an electric wire, and is adhered to the diaphragm 105 and arranged in the air gap G. Then, a magnetic flux generated in the air gap G in response to the given electric signal generates a force based on the electromagnetic induction. The diaphragm 105 is vibrated by the force generated in the voice coil 104 to generate the sounds. The frame 106 holds the yoke 101 and the diaphragm 105.

According to the above earpiece 100, when the user puts the case 11 to the user's ear to hear the received sound, the sound hole 12 of the case 11 is not perfectly covered with user's ear 14. Therefore, the sounds emitted from the electromechanical acoustic transducer 10 via the sound hole 12 are separated into the sound that is transmitted directly to the user's ear 14 and the sound that leaks from a clearance between the user's ear 14 and the case 11. As a result, the characteristic of sound reaching from the electromechanical acoustic transducer 10 to the user's ear 14 is affected by the leakage of sounds.

Figure 3:
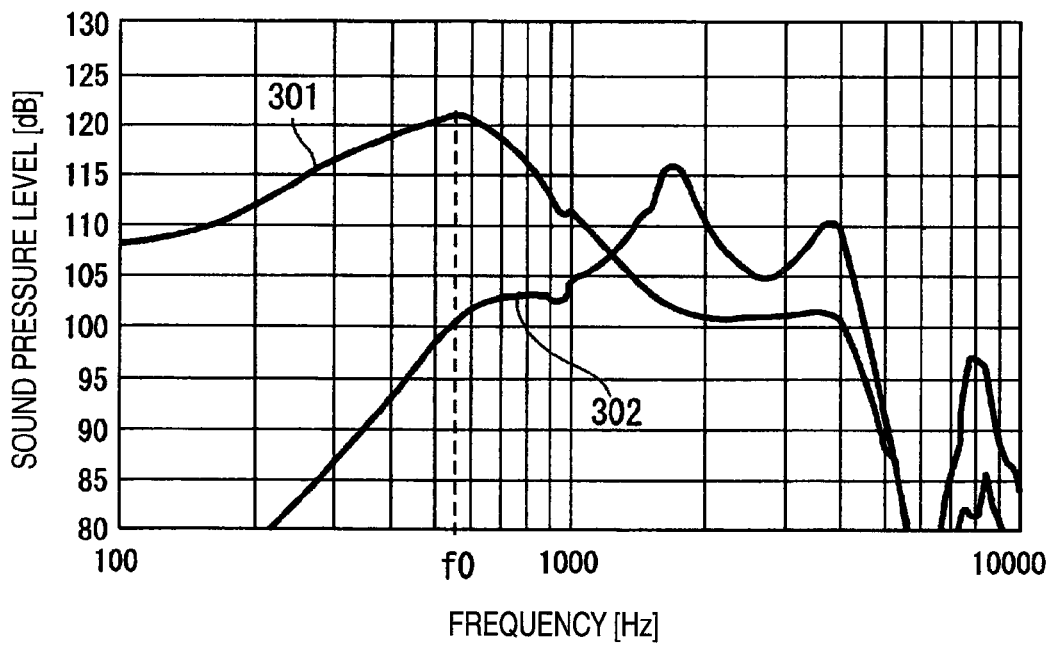
FIG. 3 A view showing a sound pressure-frequency characteristic of the electromechanical acoustic transducer when no compensation is made.

FIG. 3 is a view showing a sound pressure-frequency characteristic of the electromechanical acoustic transducer when no compensation is made, and shows a characteristic 301 when no leakage is caused and a characteristic 302 when the leakage is caused. In this case, a dynamic receiver of a bore diameter $\phi$ 10 mm was used in measuring these characteristics. Also, the characteristic 301 derived when no leakage is caused was measured under the condition that no leakage is caused by using the IEC-318 coupler, and the characteristic 302 derived when the leakage is caused was measured under the condition that the leakage is caused artificially by using the Head and Torso Simulator (abbreviated as "HATS" hereinafter). A voltage whose root-mean-square-value is 180 [mV] was applied to the electromechanical acoustic transducer 10 in respective measurements.

As shown in FIG. 3, in comparison between the characteristic 301 derived when no leakage is caused and the characteristic 302 derived when the leakage is caused, a sound pressure in a low-frequency band, especially a level of an output sound pressure below the lowest resonance frequency f0, was remarkably deteriorated in the characteristic 302 derived when the leakage is caused. In other words, the influence of the leakage between the case 11 and the user's ear 14 appeared in the sound pressure-frequency characteristic.

Therefore, in the present embodiment, a change in the sound pressure-frequency characteristic due to the leakage is measured, and then the sound pressure-frequency characteristic of the electromechanical acoustic transducer 10 is compensated beforehand based on this change. Thus, a good sound pressure can be obtained under the condition that is close to the actual using condition and the leakage is caused.

Figure 4:
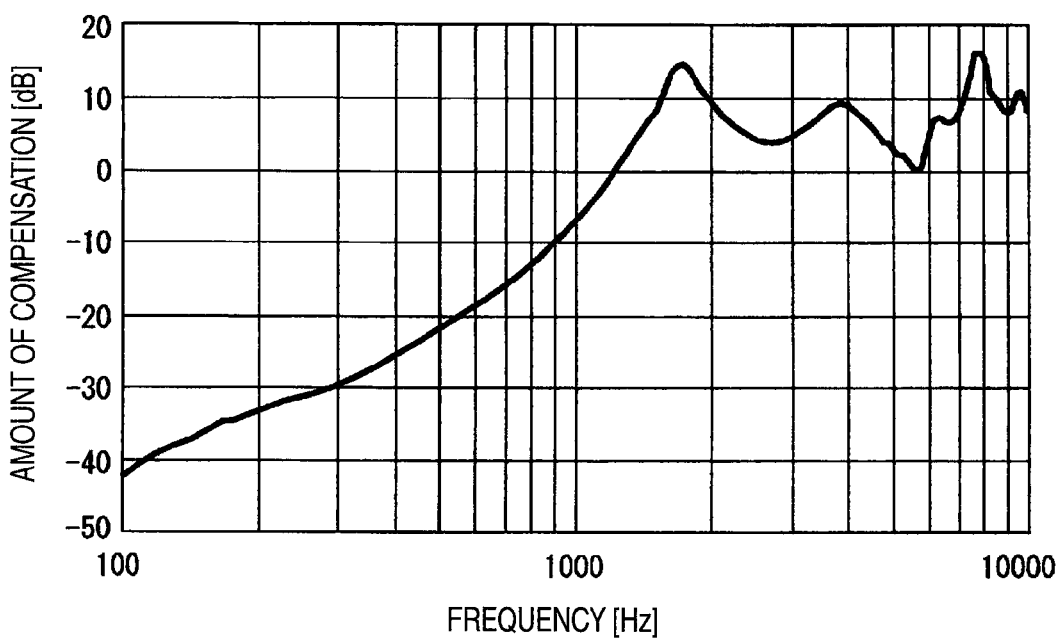
FIG. 4 A view showing an amount of compensation-frequency characteristic of the electromechanical acoustic transducer.

FIG. 4 is a view showing an amount of compensation-frequency characteristic of the electromechanical acoustic transducer. An amount-of-compensation characteristic 41 shown in FIG. 4 is a difference calculated when the characteristic 301 derived when no leakage is caused was subtracted from the characteristic 302 derived when the leakage is caused and shown in FIG. 3. The compensation of the sound pressure-frequency characteristic of the electromechanical acoustic transducer 10 was made by offsetting the sound pressure-frequency characteristic of the electromechanical acoustic transducer 10 based on this amount-of-compensation characteristic 41.

Figure 5:
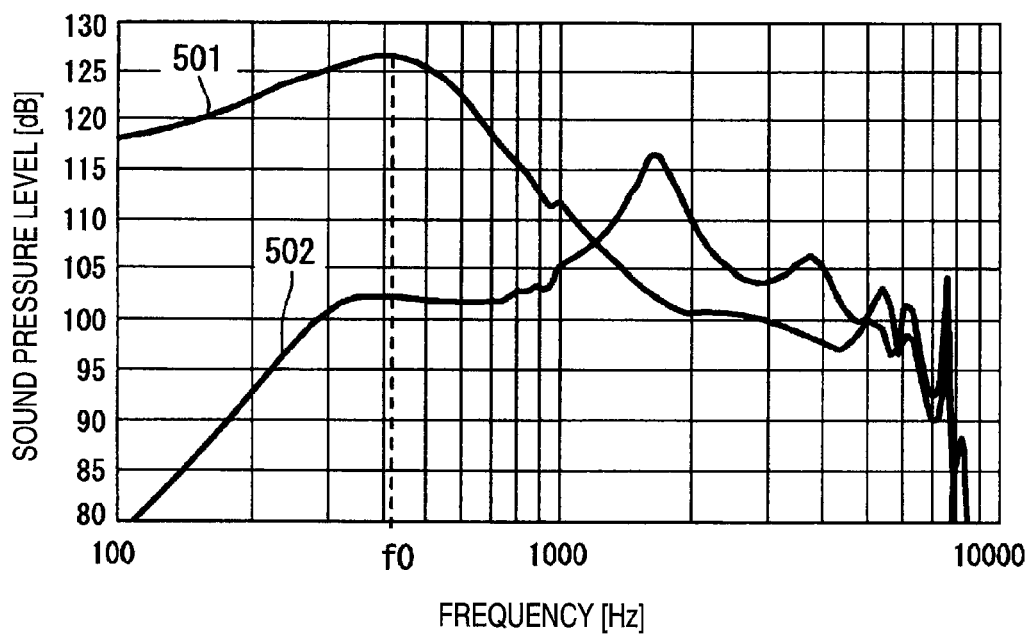
FIG. 5 A view showing a sound pressure-frequency characteristic of the electromechanical acoustic transducer when compensation is made.

FIG. 5 is a view showing a sound pressure-frequency characteristic of the electromechanical acoustic transducer when compensation is made, and shows a characteristic 501 when no leakage is caused and a characteristic 502 when the leakage is caused. In this case, a dynamic receiver of a bore diameter φ 13 mm was used in measuring these characteristics. Also, the characteristic 501 derived when no leakage is caused was measured under the condition that no leakage is caused by using the IEC-318 coupler, and the characteristic 502 derived when the leakage is caused was measured under the condition that the leakage is caused artificially by using the Head and Torso Simulator (abbreviated as "HATS" hereinafter). A voltage whose root-mean-square-value is 180 [mV] was applied to the electromechanical acoustic transducer 10 in respective measurements.

As shown in FIG. 5, the characteristic 502 derived when the leakage is caused was planarized rather than the characteristic 302 derived when the leakage is caused and shown in FIG. 3. In particular, the level of the output sound pressure in the low-frequency band was improved. In this manner, the compensation is applied in advance to the sound pressure-frequency characteristic of the electromechanical acoustic transducer 10, so that a good sound pressure can be obtained under the condition that is close to the actual using condition and the leakage is caused.

Next, an example of a method of compensating the sound pressure-frequency characteristic of the electromechanical acoustic transducer 10 will be explained hereunder. As shown in FIG. 3, the characteristic derived when no leakage is caused was deteriorated especially in the low-frequency band under the condition that no compensation is made. Therefore, as shown in FIG. 4, an absolute value of an amount of compensation (difference between the characteristic derived when the leakage is caused and the characteristic derived when no leakage is caused) became larger in the low-frequency band.

In other words, since the compensation is made such that the lowest resonance frequency f0 of the electromechanical acoustic transducer 10 is lowered, the planarized sound pressure-frequency characteristic was obtained when the leakage is caused.

Here, the lowest resonance frequency f0 is defined by following Formula 1. Where, Cms is a diaphragm compliance, and Mms is a vibration system mass containing masses of an adhesive to adhere the voice coil onto the diaphragm, and the like.

$$f0 = \frac{1}{2\pi} \cdot \frac{1}{\sqrt{Cms \cdot Mms}}$$ [Formula 1]

Here, the diaphragm compliance Cms depends on an elastic modulus of the material used as the diaphragm and a material thickness of the diaphragm. In this case, the diaphragm compliance Cms is expressed by Cms=x/F [m/N] in theory, where F [N] is a force applied to the diaphragm and x [m] is a distance over which the diaphragm is expanded.

As the material used as the diaphragm, there are PEI (polyetherimide), PEN (polyethylene naphthalate), PET (polyethylene terephthalate), elastomer, and the like, for example.

Therefore, the compensation is made by changing the elastic modulus of the material used as the diaphragm, the material thickness of the diaphragm, the vibration system mass, etc. to lower the lowest resonance frequency f0. According to Formula 1, the lowest resonance frequency f0 can be lowered in theory by increasing both the diaphragm compliance Cms and the vibration system mass Mms, but these combinations must be constructed actually.

In the example shown in FIG. 3, the lowest resonance frequency f0 is about 550 [Hz], as indicated in the characteristic 301 derived when no leakage is caused. In this case, when the sound pressure-frequency characteristic is compensated such that the lowest resonance frequency f0 is lowered to at least 550 [Hz] or less, preferably about 430 [Hz] or less, a good characteristic can be obtained under the condition that the leakage is caused.

Table 1 shows an example of combinations of a material thickness t of the diaphragm and the vibration system mass Mms when PEI is used as the material of the diaphragm. In Table 1, shaded portions show the combinations that satisfy the condition that the lowest resonance frequency f0 is about 430 [Hz] or less. It is preferable that, when the material thickness t of the diaphragm made of PEI is 8.6 [μm], for example, the vibration system mass Mms should be set to 16 to 32 [mg].

| T | Mms | | | | |
|---|---|---|---|---|---|
| | 8 mg | 12 mg | 16 mg | 24 mg | 32 mg |
| 8.6 um | 594 Hz | 485 Hz | 420 Hz | 376 Hz | 343 Hz |
| 9.3 um | 665 Hz | 543 Hz | 470 Hz | 420 Hz | 384 Hz |
| 10 um | 735 Hz | 600 Hz | 520 Hz | 465 Hz | 425 Hz |
| 12 um | 979 Hz | 799 Hz | 692 Hz | 619 Hz | 565 Hz |
| 16 um | 1507 Hz | 1231 Hz | 1066 Hz | 953 Hz | 870 Hz |

Also, Table 2 shows an example of combinations of a material thickness t of the diaphragm and the vibration system mass Mms when PEN is used as the material of the diaphragm. In Table 1, shaded portions show the combinations that satisfy the condition that the lowest resonance frequency f0 is about 430 [Hz] or less.

|  | Mms | | | | |
| --- | --- | --- | --- | --- | --- |
| t | 8 mg | 12 mg | 16 mg | 24 mg | 32 mg |
| 12 um | 490 Hz | 400 Hz | 346 Hz | 310 Hz | 283 Hz |
| 16 um | 670 Hz | 547 Hz | 474 Hz | 424 Hz | 387 Hz |
| 20 um | 840 Hz | 686 Hz | 594 Hz | 531 Hz | 485 Hz |
| 25 um | 893 Hz | 729 Hz | 631 Hz | 565 Hz | 516 Hz |
| 38 um | 1087 Hz | 888 Hz | 769 Hz | 687 Hz | 628 Hz |

In the examples given in Table 1 and Table 2, the sound pressure-frequency characteristic can be compensated when the electromechanical acoustic transducer 10 is constructed based on the combination of the material thickness t of the diaphragm and the vibration system mass Mms in the shaded portion.

According to such first embodiment of the present invention, the sound pressure-frequency characteristic of the electromechanical acoustic transducer is compensated in advance such that the sound pressure-frequency characteristic is planarized under the condition that the sounds are leaked from the clearance between the case and the user's ear. As a result, the influence of the leakage can be reduced without any addition of parts.

In the present embodiment, the case where the HATS is used to generate artificially the leakage of sounds is explained. In this case, the characteristic in the condition that the user actually uses the earpiece 100 may be measures by a probe microphone, or the like as the characteristic derived when the leakage is caused, and then the amount of compensation-frequency characteristic shown in FIG. 4 may be derived.

Also, in the present embodiment, the case where the dynamic receiver is used as the electromechanical acoustic transducer 10 is explained. In this case, a dynamic speaker, a ceramic receiver, or a ceramic speaker may be used.

Second Embodiment

Figure 6:
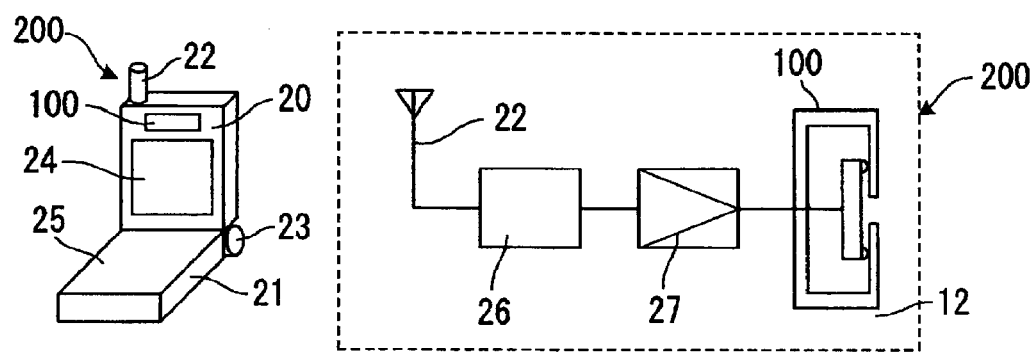
FIG. 6 A view showing a mobile terminal device according to a second embodiment of the present invention.

FIG. 6 is a view showing a mobile terminal device according to a second embodiment of the present invention, wherein FIG. 6(a) is an external perspective view of the mobile terminal device and FIG. 6(b) is a schematic internal configuration of the communication device. In FIG. 6, the same reference symbols are affixed to the redundant portions with those in FIG. 1 explained in the first embodiment. In the present embodiment, explanation will be made by taking a folding cellular phone as an example of a communication device 200. But the present embodiment is not limited to the cellular phone, and may be applied to an electronic device having a communication function such as a transceiver, a stationary communication equipment, and the like.

As shown in FIG. 6, the communication device 200 includes a first case 20, a second case 21, an antenna 22 provided to the first case 20, a hinge 23 for joining the first case 20 and the second case 21 to swing, a display portion 24, an operation portion 25, a receiver circuit 26 for converting a radio signal that the antenna 22 received into an electric signal, a signal outputting portion 27 for outputting the electric signal fed from the receiver circuit 26, and the earpiece 100 for outputting a sound in response to the electric signal output from the signal outputting portion 27.

In the communication device 200 of the present embodiment, a received sound is reproduced from the sound hole 12 when the electric signal indicating the received sound received via the antenna is applied. In this case, the earpiece 100 fulfils a function of the receiver.

According to such second embodiment of the present invention, the sound pressure-frequency characteristic of the electromechanical acoustic transducer is compensated in advance such that the sound pressure-frequency characteristic is planarized under the condition that the sounds are leaked from the clearance between the case and the user's ear. Therefore, the influence of the leakage can be reduced without any addition of parts. As a result, the influence of the leakage can be reduced not make any change in design or shape of the mobile terminal device.

Here, in the first embodiment, the characteristic derived when the sound is leaked through the clearance between the case of the earpiece 100 and the user's ear is measured as the characteristic of the electromechanical acoustic transducer 10 of the earpiece 100 derived when the leakage is caused, and then an amount of compensation is derived based on the measured result. In contrast, in the mobile terminal device of the present embodiment, the characteristic derived when the sound is leaked through the clearance between the case in which the earpiece 100 of the communication device 200 is housed and the user's ear may be measured as the characteristic derived when the leakage is caused, and then an amount of compensation may be derived based on the measured result.

Third Embodiment

Figure 7:
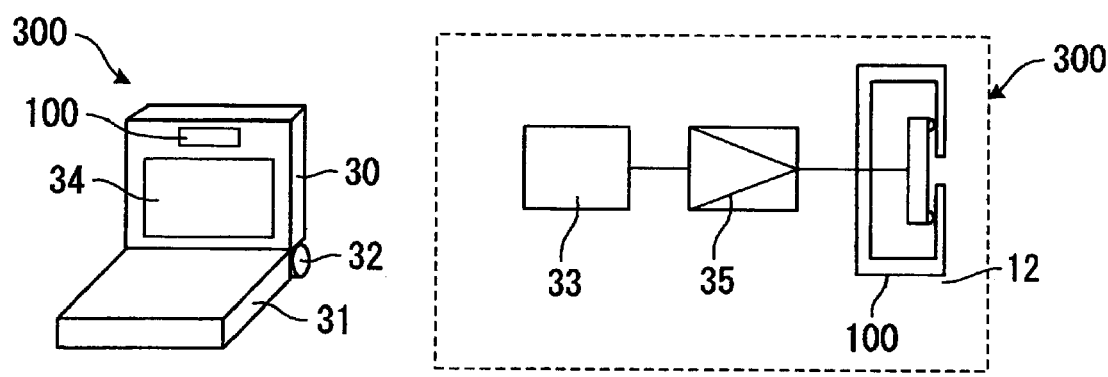
FIG. 7 A view showing an electronic device according to a third embodiment of the present invention.

FIG. 7 is a view showing an electronic device according to a third embodiment of the present invention, wherein FIG. 7(a) is an external perspective view of the electronic device and FIG. 7(b) is a schematic internal configuration of the electronic device. In FIG. 7, the same reference symbols are affixed to the redundant portions with those in FIG. 1 explained in the first embodiment. In the present embodiment, explanation will be made by taking a folding mobile terminal (PDA) device as an example of an electronic device 300. However, the present embodiment is not limited to the PDA, and may be applied to a stationary electronic device.

As shown in FIG. 7, an electronic device 300 of the present embodiment includes a first case 30, a second case 31, a hinge 32 for joining the first case 30 and the second case 31 to swing, a controlling portion 33 provided to the second case 31 to process an image signal and a sound signal, a display portion 34 provided to the first case 30 to display operation menu icons, etc., a signal outputting portion 35 for amplifying a signal from the controlling portion 33, and the earpiece 100 for outputting the sound in response to an electric signal output from the signal outputting portion 35.

In the electronic device 300 of the present embodiment, when the electric signal indicating the sound in answer to the user's operation is applied, the sound is reproduced through the sound hole 12 of the earpiece 100. According to such third embodiment of the present invention, the sound pressure-frequency characteristic of the electromechanical acoustic transducer is compensated previously such that the sound pressure-frequency characteristic is planarized under the condition that the sounds are leaked from the clearance between the case and the user's ear. Therefore, the influence of the leakage can be reduced without any addition of parts. As a result, the influence of the leakage can be reduced not make any change in design or shape of the electronic device.

Here, in the first embodiment, the characteristic derived when the sound is leaked through the clearance between the case of the earpiece 100 and the user's ear is measured as the characteristic of the electromechanical acoustic transducer 10 of the earpiece 100 derived when the leakage is caused, and then an amount of compensation is derived based on the measured result. In contrast, in the mobile terminal device of the present embodiment, the characteristic derived when the sound is leaked through the clearance between the case in which the earpiece 100 of the mobile terminal device 200 is housed and the user's ear may be measured as the characteristic derived when the leakage is caused, and then an amount of compensation may be derived based on the measured result.

The present invention is explained in detail with reference to the particular embodiments. But it is apparent for those skilled in the art that various variations and modifications can be applied without departing from a spirit and a scope of the present invention.

This application is based upon Japanese Patent Application (Patent Application No. 2005-106329) filed Apr. 1, 2005; the entire contents of which are incorporated herein by reference.

INDUSTRIAL APPLICABILITY

According to the present invention, the earpiece, the electronic device, and the communication device of the present invention possess such an advantage that the influence of leakage of sounds from the clearance between the earpiece and the ear can be reduced not to need an addition of parts, and is useful to the cellular phone, or the like.

The invention claimed is:

1. An earpiece comprising:
an electromechanical acoustic transducer that has a diaphragm, and is configured to generate a sound by vibrating the diaphragm in response to an electric signal;
a case configured to contain the electromechanical acoustic transducer;
a sound hole provided at a position of the case so as to face the electromechanical acoustic transducer; and
a holding member configured to hold the electromechanical acoustic transducer in the case, and surround a periphery of the sound hole,
wherein prior to incorporating the electromechanical acoustic transducer into the earpiece, a sound pressure-frequency characteristic of the electromechanical acoustic transducer has been compensated based on a difference between the sound pressure-frequency characteristic derived when the sound is leaked from a gap between an ear and the case and the sound pressure-frequency characteristic derived when no sound is leaked.

2. The earpiece according to claim 1, wherein the sound pressure-frequency characteristic is compensated such that a lowest resonance frequency is lowered.

3. The earpiece according to claim 1 wherein, the sound pressure-frequency characteristic of the electromechanical acoustic transducer has been compensated by adjusting a hardware characteristic of the electromechanical acoustic transducer.

4. An electronic device comprising the earpiece set forth in claim 1.

5. A communication device, comprising:
an antenna configured to receive a radio signal;
a signal outputting portion configured to output an electric signal in response to the received radio signal;
an electromechanical acoustic transducer that has a diaphragm, and is configured to generate a sound by vibrating the diaphragm in response to the electric signal being output from the signal outputting portion;
a case that contains the electromechanical acoustic transducer;
a sound hole provided at a position of the case so as to face the electromechanical acoustic transducer; and
a holding member configured to hold the electromechanical acoustic transducer in the case, and surround a periphery of the sound hole,
wherein prior to incorporating the electromechanical acoustic transducer into the device, a sound pressure-frequency characteristic of the electromechanical acoustic transducer has been compensated based on a difference between the sound pressure-frequency characteristic derived when the sound is leaked from a gap between an ear and the case and the sound pressure-frequency characteristic derived when no sound is leaked.

6. The communication device according to claim 5, wherein the sound pressure-frequency characteristic is compensated such that a lowest resonance frequency is lowered.

7. The communication device according to claim 6 wherein, the sound pressure-frequency characteristic of the electromechanical acoustic transducer has been compensated by adjusting a hardware characteristic of the electromechanical acoustic transducer.

* * * * *